United States Patent [19]

Newkirk et al.

[11] Patent Number: 5,047,269
[45] Date of Patent: Sep. 10, 1991

[54] ASSEMBLY FOR MAKING CERAMIC COMPOSITE STRUCTURES AND METHOD OF USING THE SAME

[75] Inventors: Marc S. Newkirk, Newark; H. Daniel Lesher, Wilmington, both of Del.

[73] Assignee: Lanxide Technology Company, LP, Newark, Del.

[21] Appl. No.: 298,647

[22] Filed: Jan. 18, 1989

Related U.S. Application Data

[62] Division of Ser. No. 3,102, Jan. 14, 1987, Pat. No. 4,832,892.

[51] Int. Cl.$^5$ .............................................. E06B 3/26
[52] U.S. Cl. .................................. 428/34.4; 428/188; 428/210; 428/469; 428/256; 249/135; 249/141
[58] Field of Search ................ 428/34.4, 70, 188, 201, 428/210, 457, 469, 688, 689, 256; 249/49, 113, 135, 141

[56] References Cited

U.S. PATENT DOCUMENTS

| | | | |
|---|---|---|---|
| 1,085,713 | 2/1914 | Waldman | 249/49 |
| 2,741,822 | 4/1956 | Udy | 25/167 |
| 3,255,027 | 6/1966 | Talsma | 106/65 |
| 3,296,002 | 1/1967 | Hare | 106/40 |
| 3,298,842 | 7/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,196,159 | 4/1980 | Brottmann et al. | 254/29.1 |
| 4,483,940 | 11/1984 | Ono et al. | 502/159 |
| 4,822,759 | 4/1989 | Nowkirk et al. | 501/127 |

FOREIGN PATENT DOCUMENTS 0155831 3/1985 European Pat. Off. .
0116809 11/1985 European Pat. Off. .
0169067 1/1986 European Pat. Off. .

OTHER PUBLICATIONS

"Oxidation of Molten Aluminum Alloys. Reaction with Refractories"—M. Drouzy and M. Richard–Mar, 1974–Fonderie, France No. 332, pp. 121–128.
"Refractories for Aluminum Alloy Melting Furnaces'-'-B. Clavaud and V. Jost–Sep., 1980–Lillian Brassinga (from French) Jan., 1985.

Primary Examiner—Peter A. Nelson
Attorney, Agent, or Firm—Mark G. Mortenson; Carol A. Lewis

[57] ABSTRACT

An assembly for the preparation of ceramic composite structures includes a segmented container within which a permeable filler is retained and a parent metal body is contacted with the bed of permeable filler. The segmented container is comprised of one or more segments made of a material, such as an inconnel alloy, which has a coefficient of thermal expansion which is significantly greater than that of the filler. The segments are arranged to defined between or among them one or more expansion joints which are effective to accommodate circumferential thermal expansion of the segments to thereby inhibit or prevent volumetric expansion of the container. A method of forming ceramic composite structures includes heating the resulting assembly in the presence of an oxidant to melt and oxidize the parent metal, e.g., aluminum, to form a polycrystalline material comprising an oxidation reaction product which grows through the mass of filler to embed it and thus form the composite structure.

19 Claims, 3 Drawing Sheets

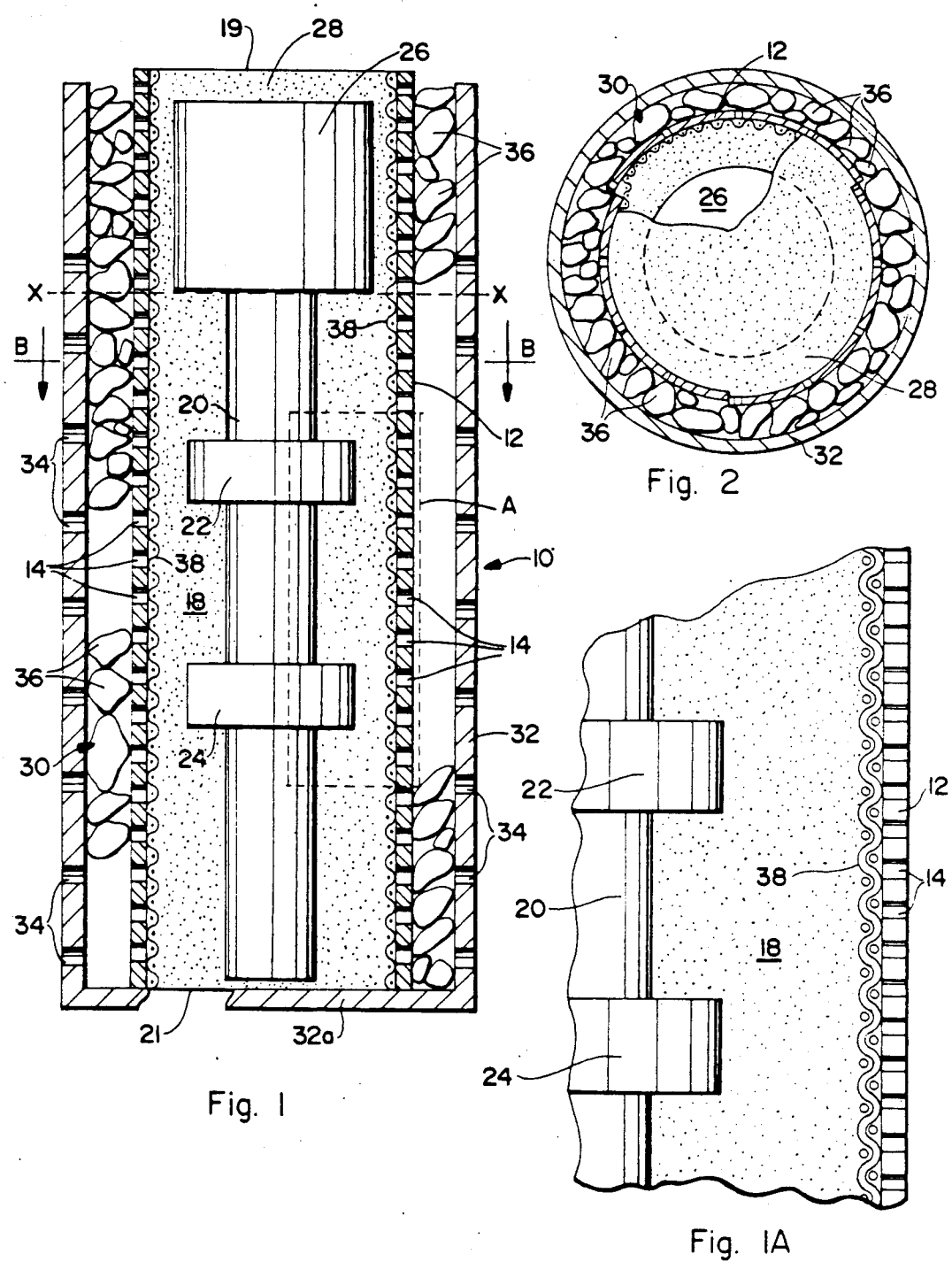

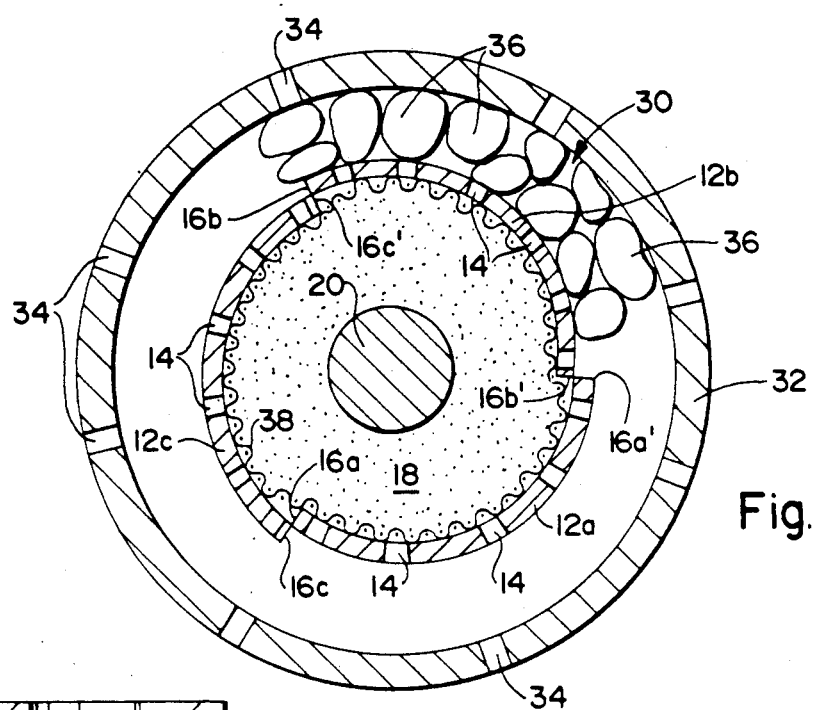
Fig. 1B
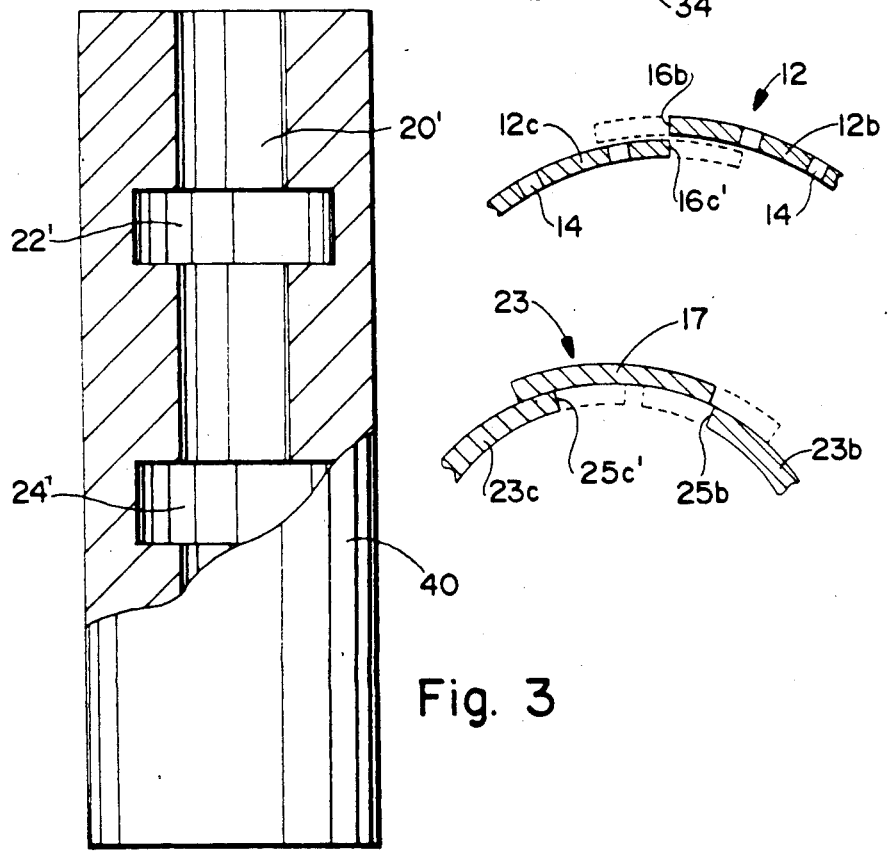
Fig. 4
Fig. 5
Fig. 3

ASSEMBLY FOR MAKING CERAMIC COMPOSITE STRUCTURES AND METHOD OF USING THE SAME

This is a divisional of co-pending application Ser. No. 003,102 filed on Jan. 14, 1987, now U.S. Pat. No. 4,832,892.

BACKGROUND OF THE INVENTION

1. Field Of The Invention

The present invention relates to an assembly used in making ceramic composite structures, and to a method of using the assembly. The assembly comprises a body of parent metal oriented with respect to a mass of permeable filler disposed within a segmented container. The assembly is heated to melt the body of parent metal, in the presence of an oxidant, and the molten parent metal is then oxidized to form a polycrystalline ceramic matrix which grows into and embeds the filler.

2. Description of Commonly Owned Patent Applications

The subject matter of this application is related to that of Commonly Owned U.S. Pat. No. 4,851,375, which issued on July 25, 1989 entitled "Methods of Making Composite Ceramic Articles Having Embedded Filler" from Application Ser. No. 819,397, filed Jan. 17, 1986, as a continuation-in-part of Ser. No. 697,876, filed Feb. 4, 1985, both application filed in the names of Marc S. Newkirk et al and entitled "Composite Ceramic Articles and Methods of Making The Same." This commonly owned Patent discloses a novel method for producing a self-supporting ceramic composite by growing an oxidation reaction product from a parent metal into a permeable mass of filler.

The method of producing a self-supporting ceramic body by oxidation of a parent metal precursor is disclosed generically in Commonly Owned U.S. Pat. No. 4,713,360, which issued on Dec. 15, 1987 from application Ser. No. 818,943, filed Jan. 15, 1986, as a continuation-in-part of Ser. No. 776,964, filed Sept. 17, 1985, as a continuation-in-part of Ser. No. 705,787, filed Feb. 26, 1985, as a continuation-in-part of Ser. No. 591,392, filed Mar. 16, 1984, all in the names of Marc S. Newkirk et al and entitled "Novel Ceramic Materials and Methods of Making Same." This invention employs an oxidation phenomenon, which may be enhanced by the use of one or more dopants alloyed in the parent metal, to afford self-supporting ceramic bodies of desired size grown as the oxidation reaction product of the precursor parent metal.

The foregoing method was improved upon by the use of one or more external dopants applied to the surface of the precursor parent metal as disclosed in Commonly Owned U.S. Pat. No. 4,853,352, which issued on Aug. 1, 1989 entitled "Method of Making Self-Supporting Ceramic Materials and Materials Made Thereby " from Application Ser. No. 220,935, filed June 23, 1988, as a continuation of Applications Ser. No. 822,999, filed Jan. 27, 1986, as a continuation-in-part of Ser. No. 776,965, filed Sept. 17, 1985, as a continuation-in-part of Ser. No. 747,788, filed June 25, 1985, as a continuation-in-part of Ser. No. 632,636, filed July 20, 1984, all in the names of Marc S. Newkirk et al and entitled "Methods of Making Self-Supporting Ceramic Materials."

A further development of the foregoing methods enables the formation of self-supporting ceramic structures which contain therein one or more cavities which inversely replicate the geometry of a positive mold of shaped precursor parent metal embedded within a bed of conformable filler which is self-bonding under specified conditions as described in Commonly Owned U.S. Pat. No. 4,828,785, which issued on May 9, 1989 entitled "Inverse Shape Replication Method of Making Ceramic Composite Articles" from Application Ser. No. 823,542, filed Jan. 27, 1986, in the names of Marc S. Newkirk et al, entitled "Inverse Shape Replication Method of Making Ceramic Composite Articles and Articles Obtained Thereby."

Yet another development of the foregoing methods enables the formation of self-supporting ceramic bodies having a negative pattern which inversely replicates the positive pattern of a parent metal precursor emplaced against a mass of filler, as described in Commonly Owned U.S. Pat. No. 4,859,640, which issued on Aug. 22, 1989 from application Ser. No. 896,157, filed Aug. 13, 1986, in the name of Marc S. Newkirk and entitled "Method of Making Ceramic Composite Articles With Shape Replicated Surfaces and Articles Obtained Thereby."

Still another development of the foregoing methods comprises forming the ceramic composite body within a container or encasement member comprised of a material, such as INCONEL, which has a larger coefficient of thermal expansion than does the ceramic composite body whereby, upon cooling of the polycrystalline ceramic body and the encasement member, the latter is shrink-fitted about the ceramic composite body to impart compression thereto. This technique is disclosed in U.S. Pat. No. 4,828,785, which issued on Apr. 18, 1989 from application Ser. No. 212,071, filed June 24, 1988, as a continuation application from application Ser. No. 908,073, filed Sept. 16, 1986 all , in the names of Marc S. Newkirk et al and entitled "Ceramic Composite Structures Having Intrinsically Fitted Encasement Members Thereon and Methods of Making the Same."

The entire disclosures of all of the foregoing Commonly Owned Patent Applications and Patents and those described below, are expressly incorporated herein by reference.

BACKGROUND AND PRIOR ART

In recent years, there has been increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which encloses one or more diverse kinds of filler materials such as particulates, fibers, rods or the like.

The Commonly Owned Patent Applications and Patents describe new processes which resolve some of the problems or limitations of traditional ceramic technology for making composites such as by compacting and sintering.

A typical assembly which may be utilized in certain aspects of the inventions described in the foregoing Commonly Owned Patent Applications and Patents includes emplacing a body of parent metal in contact with a mass or bed of permeable filler disposed within a suitable vessel or container. The vessel or container must be able to withstand the reaction conditions and retain its structural integrity, and thus may be made of a refractory material such as an INCONNEL metal, stainless steel or the like. However, if the coefficient of thermal expansion of the container is significantly greater than that of the bed of filler, upon initial heating of the assembly to melt the parent metal the container expands more rapidly than does the bed of filler. This may result in the formation of undesirable cracks, voids or discontinuities in the bed of filler as the expanding container moves away from it.

The present invention combines the processes of the above-described Commonly Owned Patent Applications and Patents with additional novel concepts to provide for fabrication of ceramic composite structures by an oxidation reaction phenomenon.

SUMMARY OF THE INVENTION

In accordance with the present invention, there is provided an assembly for use in making a self-supporting ceramic composite structure which comprises a filler embedded by a polycrystalline ceramic matrix comprising the oxidation reaction product of a precursor metal with an oxidant and, optionally, one or more metallic constituents. The assembly comprises a segmented container, which optionally may be lined with a perforated liner means such as a metal screen, e.g., a stainless steel screen, and may be perforated. The segmented container may comprise longitudinal segments of a cylindrical sleeve, within which is emplaced a permeable mass of the filler and a body of parent metal in contact with the mass of filler. For example, the body of parent metal may be embedded within the mass of filler. The segmented container is comprised of one or more segments having a coefficient of thermal expansion which is greater than that of the mass of filler, the segments being dimensioned and configured to define between them one or more expansion joints. The expansion joints are effective to accommodate thermal expansion of the segments by circumferential expansion, thereby inhibiting radial expansion of the container. segmented container so as to reduce volumetric expansion of the The segmented container may be supported by any suitable support means.

Another aspect of the invention provides for the segments to comprise a body portion having opposite longitudinal edges and at least one longitudinal marginal lip which is (i) joined to the body portion by a radially-extending shoulder, and (ii) is radially-offset from the body portion and extends circumferentially therefrom beyond the shoulder, and terminates in a longitudinal edge which is radially offset from the body portion thereby comprising an offset longitudinal edge. This construction serves to provide a circumferential clearance space between the shoulder and the offset longitudinal edge. The offset longitudinal edge of one segment of the container is juxtaposed with a longitudinal edge of an adjacent segment so as to accommodate at least some of the thermal expansion of the segments in the circumferential clearance space.

While the segmented container may be made of any suitable material, in specific embodiments of the invention the segmented container advantageously comprises a metal selected from the group consisting of nickel-based and iron-based high-temperature alloys, e.g., from the group consisting of stainless steel, an INCONNEL alloy, a FECRAL alloy, a HASTELLOY alloy and an INCOLOY alloy. INCONNEL, FECRAL, HASTELLOY and INCOLOY are trademarks of various manufacturers of hightemperature resistant nickel- or iron-based alloys.)

In accordance with the present invention, there is also provided a method for producing a ceramic composite body as described above, with reference to the Commonly Owned Patent Applications and Patents. Essentially, the method comprises (a) heating the parent metal in the presence of an oxidant to a reaction temperature range to form a body of molten metal in extended surface contact with the mass of filler, and reacting the molten parent metal with the oxidant at the reaction temperature range to form an oxidation reaction product. The reaction temperature range is above the melting point of the parent metal and below that of the oxidation reaction product. The resulting product is in contact with and extends between the body of molten metal and the oxidant, and the temperature is maintained to keep the parent metal molten, to permit the molten parent metal to be progressively drawn through the oxidation reaction product towards the oxidant and into the mass of filler so that the oxidation reaction product continues to form within the mass of filler at the interface between the oxidant and previously formed oxidation reaction product. The reaction is continued for a time sufficient to infiltrate the mass of filler to produce the ceramic composite structure comprising the oxidation reaction product. The improvement to the method comprises disposing the mass of filler within a segmented container as defined above.

The following terms, as used herein and in the claims, have the stated meanings.

"Ceramic" is not to be unduly construed as being limited to a ceramic body in the classical sense, that is, in the sense that it consists entirely of non-metallic and inorganic materials, but, rather it refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1-40% by volume, but may include still more metal.

"Oxidation reaction product" generally means one or more metals in an oxidized state wherein a metal has given up electrons to or shared electrons with another element, compound or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these, e.g., a solid and a gas, at the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

BRIEF DESCRIPTION OF THE DRAWINGS

FIG. 1 is a schematic, partially cross-sectioned view in elevation of an assembly in accordance with one embodiment of the present invention, including a segmented container;

FIG. 1A is a view on an enlarged scale of a portion of the FIG. 1 assembly enclosed within dash line area A of FIG. 1;

FIG. 1B is a view on an enlarged scale taken along line B—B of FIG. 1;

FIG. 2 is a top view in slightly reduced scale of the assembly of FIG. 1;

FIG. 3 is a partially cross-sectioned view in elevation of a self-supporting ceramic composite structure made using the assembly of FIG. 1;

FIG. 4 is a schematic plan view of one of the expansion joints of the segmented container of the assembly of FIGS. 1-2 showing its thermally expanded configuration in dash lines; and FIG. 5 is a view showing another embodiment of an expansion joint;

DETAILED DESCRIPTION OF THE INVENTION AND PREFERRED EMBODIMENTS THEREOF

Figure 6:
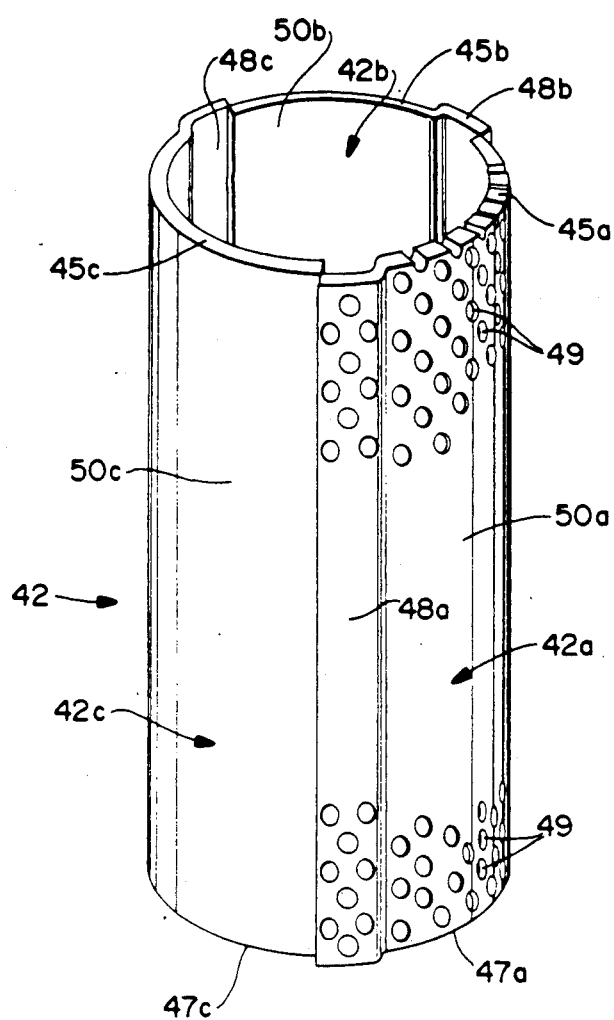
FIG. 6 is a perspective view in elevation showing another embodiment of a segmented container in accordance with the present invention.

Referring to the drawings, FIG. 1 shows an assembly 10 comprising a segmented container 12 which is substantially cylindrical in shape and comprised of three segments 12a, 12b and 12c, as best seen in FIG. 1B. Each of segments 12a, 12b and 12c terminates in a pair of opposite longitudinal edges 16a, 16a', 16b, 16b' and 16c, 16c'. Segmented container 12 is of perforated construction, each of the segments 12a, 12b and 12c having formed therein a regular pattern of perforations 14. The individual segments 12a, 12b and 12c are arranged relative to each other to define a substantially cylindrical interior volume of segmented container 12 within which is disposed a bed or mass 18 of permeable filler.

As best seen in FIGS. 1B and 2, the segments 12a, 12b and 12c of segmented container 12 are positioned in a staggered or "pin wheel" arrangement as illustrated in FIG. 1B with successive ones of the longitudinal edges 16a, 16a', 16b, 16b', 16c and 16c' arranged radially offset relative to the longitudinal edge adjacent to it in alternating radially in and out series so that expansion joints are formed between adjacent longitudinal edges, such as edges 16c and 16a. That is, the adjacent longitudinal edges are radially offset with respect to each other. With reference to the drawings, and as used herein and in the claims, reference to "radial", "radially" or the like with respect to a direction, dimension or the like, refers to a direction which extends transversely of the circumference of the segmented container, for example, with reference to FIG. 1B, it refers to a direction or dimension along a radius of the circle approximated by the alignment of segments 12a, 12b and 12c. On the other hand, reference to "circumferential" or "circumferentially" or the like refers to a direction or dimension along the circumference of the segmented container. For example, with reference to FIG. 1B, a circumferential direction or dimension is one along the circle approximated by the top marginal edges of the segments 12a, 12b and 12c.

Figure 1C:
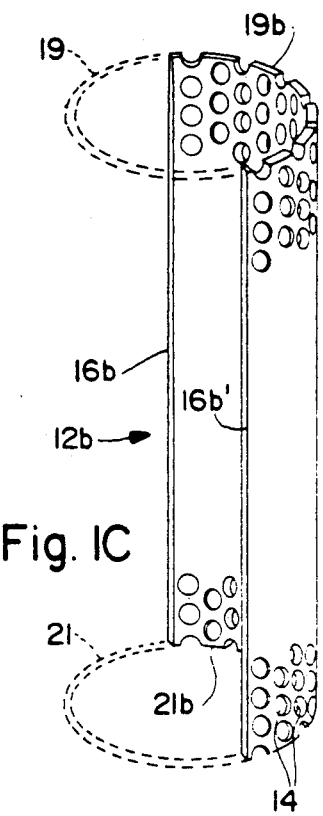
FIG. 1C is a perspective view on a reduced scale of one segment of the segmented container shown in FIGS. 1-1B.

In the illustrated embodiments, the segmented containers are of generally circular cylindrical shape and three segments, each subtending about 120° of the arc of a circle, are provided. Obviously, a greater or lesser number of segments may be utilized. FIG. 1C is a perspective view of segment 12b alone, showing longitudinal edges 16b and 16b' respectively extending between top circumferential edge 19b and bottom circumferential edge 21b.

The longitudinal edges defining the respective illustrated segments are straight-line edges extending parallel to the longitudinal axis of the segmented container. However, it will be appreciated that other configurations of the longitudinal edges may be employed, such as spiral or other curved longitudinal edges extending between the top and bottom circumferential edges of the container. Further, the segmented container need not be of constant cross-sectional size throughout but may substantially define a cone, a sphere, hemisphere or other desired shape. Still further, the segmented container need not be of circular cylindrical construction but could be a cylinder of oval or polygonal cross section outline. For example, the sides of a cylinder of square or rectangular cross section could be comprised of flat segments having expansion joints formed therebetween. Securement means (not shown) may be utilized to hold the segments of the container in position. For example, strapping material made of an organic polymeric material which is combusted or vaporized upon heating may be employed to temporarily hold the segments in place while the segmented container is filled and the support means 30 comprising the cylindrical vessel 32 and fragments 36, are emplaced about it. Any other suitable means may be employed to retain the segments in proper alignment, such as shims, spacers or mounting clips, provided such means do not interfere with the desired direction of lateral expansion of the individual segments of the segmented container. The edges of the segments, i.e., the marginal and recessed edges between which the expansion joints of the illustrated embodiments are formed, generally extend longitudinally of the segmented container from the top to the bottom thereof.

A source body 20 of parent metal is of substantially cylindrical shape and circular cross-section, and has a pair of disc-shaped protrusions 22, 24 formed therein. A reservoir body 26 of identical parent metal is positioned atop and is contiguous to body 20. Reservoir 26 may be contained within a bed 28 of particulate barrier material which will not readily support the growth of polycrystalline oxidation reaction product therethrough under the process conditions such as, for example, a bed of EL ALUNDUM particles, (alumina particles obtainable from Norton Company) with an aluminum alloy parent metal (10% Si, 3% Mg) in air at 1250° C. The particles may be of any suitable grit size, such as 90 grit. Thus, within segmented container 12, the bed 18 of permeable filler extends from the bottom circumferential edge 21 of container 12 up to about the level defined by plane X—X in FIG. 1, and the bed 28 of barrier material extends from above plane X—X to the top circumferential edge 19 of container 12. Optionally, a physical barrier such as a stainless steel plate may be positioned at the level X—X to separate the bed 18 of filler from the bed 28 of barrier material. If used, such barrier plate would have a hole therein to permit the passage of molten parent metal from reservoir 26 to parent metal body 20.

A support means is generally indicated at 30 (FIGS. 1, 1B and 2) and comprises a cylindrical vessel 32 having a closed bottom wall 32a (FIG. 1) and a series of perforations 34 formed in the vertical side wall thereof. Cylindrical vessel 32, where desired, may be made of a material such as a ceramic material having a coefficient of thermal expansion identical to or close to that of the bed 18 of filler. Cylindrical vessel 32 is of larger diameter than segmented container 12 and the resulting annular space between the outer periphery of segmented container 12 and the inner periphery of cylindrical vessel 32 is filled with large fragments 36 of crushed ceramic material. Ideally, the fragments 36 will comprise a material having a coefficient of thermal expansion which is identical to or close to that of cylindrical vessel 32 and filler bed 18. The fragments 36 of crushed ceramic material are large and irregularly shaped so as to provide ample interstitial space therebetween. In this manner, a vapor-phase oxidant such as air has ready access through perforations 34, the interstitial spaces between fragments 36, and perforations 14 of segmented container 12, thence through bed 18 of permeable filler.

A liner means comprising, in the illustrated embodiment a stainless steel open mesh screen 38 (best seen in FIGS. 1A and 1B) lines the interior of segmented container 12 and serves to prevent the small sized particles of filler bed 18 from falling through the perforations 14 in segmented container 12.

In a typical embodiment, the parent metal body 20 and the reservoir 26 each comprise an aluminum parent metal and bed 18 of permeable filler comprises any suitable filler material, such as those described elsewhere herein. Segmented container 12 may comprise a nickel or iron-based high-temperature alloy, for example, an INCONNEL HASTELLOY, or INCOLOY, or a stainless steel or any other suitable metal or alloy. Typically, such alloys have coefficients of thermal expansion which are greater than that of the filler bed 18 and of the polycrystalline ceramic material formed by oxidation of the molten parent metal. The assembly as illustrated in FIG. 1 may be placed into a furnace which is open to the atmosphere so that air circulates therein and serves as a vapor-phase oxidant. The assembly is heated to a temperature within a desired temperature range above the melting point of, for example, the aluminum parent metal but below the melting point of the oxidation reaction product thereof formed upon contact of the parent metal with an oxidant, such as oxygen in the air. Upon being heated to such elevated temperatures, the segments 12a, 12b and 12c of segmented container 12 expand to a significantly greater extent than does bed 18.

Figure 7:
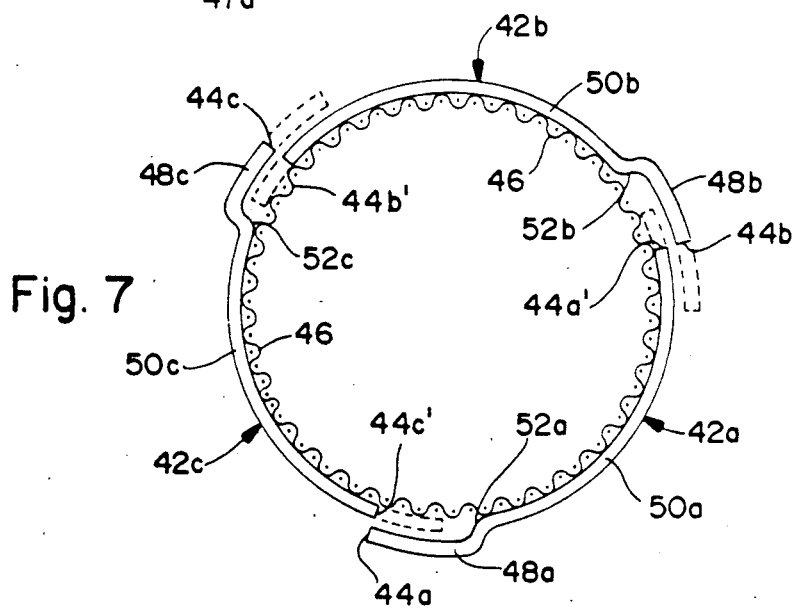
FIG. 7 is a top plan view of the segmented container of FIG. 5 equipped with a stainless steel screen providing a foraminous liner means lining the segmented container, FIG. 7 showing the thermally expanded configuration of the segmented container in dash lines.

Upon heating of the assembly, much of the thermal expansion of the segments 12a, 12b and 12c is taken up, as shown in FIG. 4, by circumferential expansion (indicated by dash lines in FIG. 4) of the individual segments 12a, 12b and 12c. Thus, in FIG. 4 (as in FIGS. 5 and 7) the segments of the segmented container are shown in solid line rendition in their ambient temperature condition and are shown in dash line in their thermally expanded condition attained after the assembly has been heated to the operating temperature region of the process. The amount of thermal expansion indicated by the dash line in FIGS. 4, 5 and 7 is not drawn to any particular scale and is somewhat exaggerated for clarity of illustration. Referring to FIG. 4, it will be appreciated that the illustrated arrangement permits accommodation of the thermal expansion of the segments by the circumferential expansion to the configuration indicated by the dash lines, thereby inhibiting radial expansion of the segmented container so as to reduce volumetric expansion of the container 12.

Providing the container in the form of a segmented container having expansion joints between the segments thus reduces volumetric expansion of the container upon thermal expansion of the individual segments. In contrast, if segmented container 12 were provided in the form of a simple, unsegmented cylindrical sleeve, thermal expansion undergone by the container upon heating to the elevated temperatures employed in the process would result in an increase of the volume of the container as it expanded radially outwardly upon heating. By segmenting the container and providing expansion joints between the segments, as illustrated, for example, in FIGS. 1B and 4, volumetric expansion of the container 12 is reduced and, consequently, the formation of voids, cracks or other discontinuities in the bed 18 upon heating is reduced or substantially eliminated.

FIG. 5 shows another embodiment of expansion joint utilizable in accordance with the present invention in which segments 23c and 23b have their associated longitudinal edges 25c' and 25b positioned adjacent to each other but spaced significantly further apart than corresponding longitudinal edges 16c' and 16b of the FIG. 4 embodiment. An extension piece 17, which is longitudinally co-extensive with segments 23c and 23b is welded or otherwise joined to segment 23c and extends laterally beyond its longitudinal edge 25c', terminating in approximately circumferential alignment with longitudinal edge 25b. Extension piece 17 serves to cover the rather large circumferential joint provided between longitudinal edges 25c' and 25b, thus helping to support a screen or other lining means which optionally may be employed, and/or helping to retain the filler particles within the segmented container 23. Upon thermal expansion of the segments of segmented container 23, the segments and associated extension piece 17 expand from their ambient temperature condition shown in solid lines, to their thermally expanded configuration indicated by dash lines in FIG. 5.

The assembly of FIG. 1 is maintained at a suitable reaction temperature for a time sufficient to oxidize the molten parent metal to form the polycrystalline oxidation reaction product which infiltrates and embeds filler 18 to form the desired ceramic composite material. As the parent metal 20 is consumed, it is replenished by parent metal from the reservoir 26 and the reaction is continued for the desired length of time, usually until the growing polycrystalline ceramic material engages the barrier provided by liner means comprised of screen 38 lining segmented container 12. At this point, the temperature is reduced and the assembly is allowed to cool. Segmented container 12 is removed from support means 30 and the ceramic composite body 40 (FIG. 3) is separated therefrom. Ceramic composite body 40 may be obtained by cutting along the plane X—X (FIG. 1) or along a plane slightly below plane X—X to provide a substantially cylindrical ceramic composite body 40 having an interior which inversely replicates the shape of parent metal 20. Thus, ceramic body 40 has a central cavity 20' including enlarged chambers 22' and 24', which may be filled with resolidified parent metal if sufficient replenishment of parent metal was made to keep those volumes filled with molten parent metal until the reaction was completed. If desired, the solidified parent metal, say solidified aluminum, may be removed from ceramic composite body 40 by drilling and chemical etching to provide a ceramic body 40 having a hollow bore corresponding to cavity 20' extending therethrough and including enlarged hollow chambers 22' and 24'.

Referring now to FIGS. 6 and 7, there is shown another embodiment of the invention in which a segmented container 42 is comprised of three segments 42a, 42b and 42c, each of which has respective opposite longitudinal edges 44a, 44a'; 44b, 44b'; and 44c, 44c'. Respective top marginal edges 45a, 45b and 45c and respective bottom marginal edges 47a and 47c are shown in FIG. 6. (The bottom marginal edge of segment 42b is not visible in FIG. 6.) Segment 42a is shown in FIG. 6 as being perforated by a plurality of perforations 49 spaced over the entirety of the surface of segment 42a, although not all are shown, for economy of illustration. Segments 42b and 42c are illustrated as being of imperforate construction, for illustrative purposes. It will be appreciated that usually all the segments of a container will either be perforated or of imperforate construction to provide either a fully perforated or an unperforated container.

A liner means 46 comprises an open mesh stainless steel screen and comprises a lining for the interior of segmented container 42. (Liner means 46 is omitted from FIG. 6 for clarity of illustration.) In this embodiment, each of the segments 42a, 42b and 42c has a marginal lip 48a, 48b and 48c respectively associated therewith and disposed radially outwardly of the associated body portions 50a, 50b and 50c. In the illustrated embodiment, the segments are of arcuate configuration. Shoulders 52a, 52b and 52c are formed at the juncture of the marginal lips 48a, 48b and 48c with the associated body portions 50a, 50b and 50c extending radially therebetween. The marginal lips terminate in respective associated longitudinal edges 44a, 44b and 44c and respective juxtaposed longitudinal edges 44a', 44b' and 44c' are disposed radially inwardly of their associated longitudinal edges 44a, 44b and 44c. In the embodiment illustrated in FIGS. 6 and 7, the resultant joint construction is seen to be similar to that of FIG. 5 except that instead of an extension piece 17 being welded across each expansion joint, marginal lips 48 are integrally formed with the body portion of the individual segments, as by stamping.

With the construction illustrated, circumferential clearance spaces are provided between adjacent segments. For example, a typical circumferential clearance space is formed between shoulder 52c and longitudinal edge 44b, and such circumferential clearance spaces accomodate circumferential thermal expansion of the segments 42a, 42b and 42c, as indicated by the dash lines shown in FIG. 7, thereby inhibiting or substantially eliminating volumetric expansion of segmented container 42.

The following example is illustrative of one embodiment of the practice of the invention.

EXAMPLE

The Assembly

An assembly generally similar to that illustrated in FIG. 1 was provided in which the segmented container (corresponding to 12 in FIG. 1) comprised a perforated 22 gauge 304 alloy stainless steel cylinder cut parallel to the longitudinal center axis of the cylinder into three equal-sized segments, each of which thus comprised an arcuate body subtending 120° of arc of a circle. The stainless steel sheet had a regular pattern of perforations, 0.0625 inches in diameter arranged on 3/32 inch centers. Angle reinforcement braces, also fabricated from 304 alloy stainless steel, were welded to the outer surfaces of the segments, extending longitudinally of the segments. The segments were arranged in a "pin wheel" configuration such as illustrated in FIGS. 1B and 2 of the drawings to provide expansion joints between each of the three segments. The angle braces were positioned away from the longitudinal edges defining the expansion joints so as not to interfere with circumferential thermal expansion of the segments. The segmented container had an inside diameter of approximately 7.5 inches.

A cylindrical body of parent metal was placed within the segmented container coaxially with the longitudinal center axis thereof and embedded therein within a bed of filler (corresponding to 18 of FIG. 1) comprised of 90 grit, 38 Alundum (Norton Company) provided with a silicon dopant as described below. A parent metal reservoir (corresponding to 26 of FIG. 1) was placed atop and contiguous to the parent metal body and embedded within a bed (corresponding to 28 of FIG. 1) of untreated 90 grit, 38 Alundum. That is, the bed of particulate Alundum embedding the reservoir body was not treated with a dopant. Each of the parent metal bodies comprised an aluminum alloy containing 10 percent by weight silicon and 3 percent by weight magnesium, which serve as internal dopants. The segmented container assembly and its contents were supported within a support structure of the type illustrated in FIG. 1, comprising an outer cylindrical vessel (corresponding to 32 of FIG. 1) having air holes (corresponding to 34 of FIG. 1) of 0.75 inch diameter drilled therein in a random pattern. The cylindrical support vessel was a ceramic body of approximately 12 ½ inches inside diameter formed of an alumina castable refractory such as AP Greencast 94 by AP Green Corp. The annular space between the cylindrical segmented container and the outer, cylindrical support vessel was filled with large fragments (corresponding to 36 of FIG. 1) of irregularly shaped green-cast ceramic material identical to that from which the cylindrical support vessel was made.

A liner means (corresponding to 38 of FIGS. 1 and 1B) was provided by lining the interior of the segmented container with a 26 gauge 304 stainless steel mesh.

Doping Of The Filler

Ninety-seven parts by weight of the 90 grit, 38 Alundum particles were mixed with three parts by weight of a commercial Newport #1 dry sand, 88 percent by weight of which comprised particles of 100 mesh or finer. The mixture of particles was admixed in a ballmill for 24 hours and then heated in an air atmosphere at a temperature of from 1250° C. to 1425° C. for 24 hours. The sand (silica) became glassy and bonded to the alumina particles. The resulting agglomerated material was then ground to provide a fine particulate material and employed as the body of permeable filler.

Formation Of The Ceramic Composite Material

The above-described assembly is placed in a furnace vented to provide a circulating air atmosphere therein and heated from ambient temperature to a temperature of 1250° C. over a ten-hour period, and then held at 1250° C. for a period of 225 hours, then allowed to cool over a thirty-hour period to ambient temperature.

A ceramic composite body comprising a polycrystalline oxidation reaction product of the molten aluminum alloy and the air as the oxidant was formed, embedding doped filler. The resulting ceramic composite body was recovered from the assembly, the interior of the ceramic composite body being filled with a remainder of unconsumed, resolidified aluminum parent metal in the shape of the original parent metal source body. The segmented container is readily removed by breaking it from the surface of the composite body, due to the substantial oxidation and low strength of the container following the process.

The method of the invention may be practiced with assemblies having one or more of the herein-described features. The assemblies may be made, and the method carried out, with any suitable combination of parent metal, oxidant and, optionally, one or more suitable dopant materials used in conjunction with the parent metal. For example, the parent metal may be selected from the group consisting of aluminum, silicon, titanium, tin, zirconium, and hafnium. Preferably, the parent metal is an aluminum parent metal and a vaporphase oxidant comprising an oxygen-containing gas is used. For example, in one embodiment of the invention, the oxidant comprises air, the oxidation reaction product comprises alumina, and the temperature region is from about 850° C. to 1450°. If a more refractory parent metal is employed, the metal chosen for the container may be required to be more refractory.

As disclosed in the Commonly Owned Patent Applications, the polycrystalline oxidation reaction product has interconnected crystallites usually interconnected in three dimensions. In addition, a metallic component and/or porosity is distributed or dispersed through the ceramic body, which may or may not be interconnected, depending on process conditions, parent metal, dopant, etc.

In the practice of the present invention, the process is continued until the polycrystalline oxidation reaction product formed by oxidation of the parent metal has infiltrated and embedded the filler material to a desired extent, which may be controlled by growing the polycrystalline material into contact with the interior surface of the segmented container or the liner means lining it. The segmented container or the liner means will serve as a barrier to further growth of the polycrystalline ceramic material and thus may be employed as a barrier or stop means which serves to define the geometry of the outer surface of the ceramic composite material.

The parent metal may optionally be arranged to provide a reservoir of parent metal which replenishes a source of parent metal in contact with the body or mass of filler, in accordance with the methods disclosed in another copending and Commonly Owned Patent Application, U.S. patent application Ser. No. 908,067, now allowed, filed Sept. 16, 1986, in the names of Marc S. Newkirk et al and entitled "Reservoir Feed Method of Making Ceramic Composite Structures nad Structures Made Thereby." The reservoir of parent metal flows by gravity flow communication to replenish parent metal which has been consumed in the oxidation reaction process, thereby assuring ample parent metal is available to continue the process until the desired amount of polycrystalline material is formed by the oxidation reaction.

In certain embodiments of the invention, the mass of permeable filler is conformed to a shaped parent metal which is placed in conforming engagement with the filler so that the resulting ceramic composite structure has formed therein a negative pattern or one or more cavities which inversely replicate the shape or geometry of the parent metal body. For example, the shaped parent metal body may be entirely embedded within the mass of permeable filler as disclosed in Commonly Owned U.S. Pat. No. 823,542, which issued May 9, 1989 entitled "Inverse Shape Replication Method of Making Ceramic composite Articles" from application Ser. No. 832,542, filed Jan. 27, 1986, in the names of Marc S. Newkirk et al and entitled, "Inverse Shape Replication Method of Making Ceramic Composite Articles and Articles Obtained Thereby", in which case, as the molten parent metal is oxidized and the resultant oxidation reaction product infiltrates the surrounding bed of permeable filler, a cavity is formed in the resultant ceramic composite body by migration of the molten parent metal. The resultant cavity inversely replicates the geometry of the shaped parent metal body or mold initially embedded within the filler. In such case, because a pressure differential builds up across the developing shell of oxidation reaction product within the filler, the permeable filler, or at least a support zone of such filler immediately adjacent to the embedded shaped parent metal, should sinter or otherwise self-bond at the appropriate temperature range. Such self-bonding serves to provide mechanical strength during the initial growth stage sufficient to prevent collapse of the growing shell of oxidation reaction product due to the pressure differential acroos it. As the oxidation reaction product grows to sufficient thickness, it becomes strong enough to resist the pressure differential.

As disclosed in Commonly Owned U.S. Pat. No. 4,859,640, a portion of the parent metal body may be shaped to a desired configuration and the shaped portion of the parent metal body embedded within the mass of permeable filler, leaving a non-replicating portion of the parent metal free of the filler. In such case, a completely enclosed cavity isolated from the surrounding atmosphere is not formed by the migration of molten parent metal as the growing oxidation reaction product infiltrates and embeds the filler. Therefore, the pressure differential problem is not encountered and a self-bonding filler is not essential but, of course, may be employed if desired.

It should be understood, however, that it is not essential to the practice of the present invention that the parent metal body be of a shaped body, all or part of which is to be inversely replicated in the permeable filler. For example, a parent metal, the shape of which is immaterial, may simply be placed atop the bed of permeable filler and melted, or a quantity of molten parent metal may be brought into contact with the bed of filler, in such a way that the oxidation reaction product formed therefrom infiltrates and embeds the filler.

The parent metal may comprise one or more pieces and it may be a simple cylinder, bar, ingot, billet or the like or it may be suitable shaped by any appropriate means, for example, by machining, casting, molding, extruding or otherwise shaping the parent metal. The negative pattern or cavity thus formed in the ceramic composite body will contain or be filled with parent metal which resolidifies as the structure is allowed to cool after processing. The resolidified parent metal may optionally be removed from the negative pattern or cavity containing it, as described below. The resulting shaped ceramic composite product thus comprises a filler embedded by a polycrystalline ceramic matrix and intrinsically fitted to one or more encasement members. The ceramic matrix itself optionally may include one or more non-oxidized constituents of the parent metal, or voids, or both and has a surface geometry of selected shape dictated by the configuration of the container within which the bed of filler is disposed. (Non-oxidized constituents of parent metal optionally dispersed within the ceramic matrix are not to be confused with any bulk resolidified parent metal left behind in the negative pattern or cavity formed in the bed of filler by the parent metal embedment body).

Although the invention is described in detail with specific reference to aluminum as the preferred parent metal, other suitable parent metals which meet the criteria of the present invention include, but are not limited to, silicon, titanium, tin, zirconium and hafnium. For example, specific embodiments of the invention include, when aluminum is the parent metal, alpha-alumina or aluminum nitride as the oxidation reaction product; titanium as the parent metal and titanium nitride or titanium boride as the oxidation reaction product; silicon as the parent metal and silicon carbide, silicon boride or silicon nitride as the oxidation reaction product.

A solid, liquid, or vapor-phase oxidant, or a combination of such oxidants, may be employed. Typical vapor-phase oxidants include, without limitation, oxygen, nitrogen, a halogen, sulphur, phosphorus, arsenic, carbon, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, silicon nitride, hafnium boride and tin oxide.

Although any suitable oxidants may be employed, specific embodiments of the invention are described below with reference to use of vapor-phase oxidants. If a gas or vapor oxidant, i.e., a vapor-phase oxidant, is used, the filler is permeable to the vapor-phase oxidant so that upon exposure of the bed of filler to the oxidant, the vapor-phase oxidant permeates the bed of filler to contact the molten parent metal therein. For example, oxygen or gas mixtures containing oxygen (including air) are preferred vapor-phase oxidants, as in the case where aluminum is the parent metal, with air usually being more preferred for obvious reasons of economy. When a vapor-phase oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole or predominant oxidizer for the parent metal because oxygen is a significantly stronger oxidant than nitrogen. Air therefore falls within the definition of an "oxygencontaining gas" oxidant but not within the definition of a "nitrogen-containing gas" oxidant. An example of a "nitrogen-containing gas" oxidant is "forming gas", which contains 96 volume percent nitrogen and 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron, or reducible compounds, such as silicon dioxide or certain borides of lower thermodynamic stability than the boride reaction product of the parent metal. For example, when boron or a reducible boride is used as a solid oxidant for an aluminum parent metal the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler or a portion thereof adjacent the molten metal is coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses. If a liquid and/or solid oxidant, but not a vapor-phase oxidant, is employed, then the segmented container and any support structure used in conjunction with it may not be perforated or of foraminous construction in order to admit the vapor-phase oxidant therethrough.

An oxidant which is liquid or solid at the process conditions may be employed in conjunction with the vapor-phase oxidant. Such additional oxidants may be particularly useful in enhancing oxidation of the parent metal preferentially within the filler bed, rather than beyond its boundary surfaces. That is, the use of such additional oxidants may create an environment within the filler more favorable to the oxidation kinetics of the parent metal than the environment outside the filler. This enhanced environment is beneficial in promoting matrix development within the filler to the boundary and minimizing overgrowth.

The filler utilized in the practice of the present invention may be one or more of a wide variety of materials suitable for the purpose. The filler may be a "conformable" filler which term, as used herein and in the claims, means that the filler is one which can be emplaced within a container and will conform to the interior configuration of the container. A conformable filler can also conform to the parent metal source body embedded within, or placed into conforming engagement with, the filler, as described above. For example, if the filler comprises particulate material such as fine grains of a refractory metal oxide such as alumina, the filler will conform to the interior configuration of the container or encasement member in which it is emplaced. However, it is not necessary that the filler be in fine particulate form to be a conformable filler. For example, the filler could be in the form of fibers such as short chopped fibers or in the form of a fiber wool-like material, e.g., something like steel wool. The filler may also comprise a combination of two or more such geometric configurations, i.e., a combination of small particulate grains and fibers. To comprise a conformable filler as used herein, it is necessary only that the physical configuration of the filler be such as to permit the filler to fill and conform to the configuration of the interior surface of the barrier means container in which it is emplaced. Such conformable filler will also closely conform to the surfaces of the parent metal body or portion thereof which is embedded within or in conforming engagement with the mass of conformable filler. Any useful shape or combination of shapes of filler may be employed, such as one or more of hollow bodies, particulates, powders, fibers, whiskers, spheres, bubbles, steel wool, plates, aggregate, wires, rods, bars, platelets, pellets, tubes, refractory fiber cloth, tubules, or mixtures thereof. Suitable ceramic filler compositions include metal oxides, carbides, nitrides and borides such as alumina, silicon carbide, titania, hafnia, zirconia, titanium diboride, and aluminum nitride.

As disclosed in the above-mentioned Commonly Owned U.S. Pat. No. 4,713,360 and U.S. Pat. No. 4,853,352 Ser. No. 822,999, one or more suitable dopants may be utilized to facilitate the growth of oxidation reaction product from the molten parent metal. One or more dopant metals may be alloyed into the parent metal (U.S. Pat. No. 4,713,360), or one or more dopants or sources thereof (such as oxides of the dopant metals) may be applied externally to the surface of the shaped parent metal or in close proximity thereto U.S. Pat. No. 4,853,352. Alternatively, or in addition, in those cases where the growing oxidation reaction product is infiltrated into a filler (as in the embodiment illustrated in FIGS. 1-2), one or more dopants may be applied in the filler itself, or the filler may comprise a dopants). Two or all three of the foregoing techniques may be used in combination. Reference herein and in the claims to a dopant "used in conjunction with the parent metal" is intended to include any of the foregoing techniques or any combination of them. Suitable dopants comprise a source of one or more of magnesium, zinc, silicon, germanium, tin, lead, boron, sodium, lithium, calcium, phosphorus, yttrium, and rare earth metals. The rare earth metals preferably are selected from the group consisting of lanthanum, cerium, praseodymium, neodymium and samarium. For example, the combination of magnesium and silicon dopants has been found to be particularly efficacious when used in conjunction with aluminum parent metals when the oxidant is air.

A typical ceramic composite structure obtained by the practice of the present invention will be a dense, coherent mass wherein between about 5% and about 98% by volume of the total volume of the composite structure is comprised of one or more of the filler components embedded within a polycrystalline matrix material. The polycrystalline matrix material is usually comprised of, when the parent metal is aluminum and air or oxygen is the oxidant, about 60% to about 98% by weight (of the weight of polycrystalline material) of interconnected alpha-alumina oxide and about 1% to 40% by weight (same basis) of non-oxidized constituents of the parent metal.

What is claimed is:

1. An assembly for use in making a self-supporting ceramic composite structure comprising a filler and a polycrystalline ceramic matrix embedding said filler, said ceramic matrix comprising an oxidation reaction product of a parent metal with an oxidant, said assembly comprising:
   (a) a segmented container;
   (b) a permeable mass of filler disposed within said container; and
   (c) a body of parent metal disposed in contact with said mass of filler, said segmented container comprising at least one segment having a coefficient of thermal expansion greater than a coefficient of thermal expansion of said mass of filler, said at least one segment being dimensioned and configured to define at least one expansion joint which accommodates thermal expansion of said at least one segment by circumferential expansion thereof, thereby inhibiting radial expansion of said segmented container so as to reduce volumetric expansion of said container.

2. The assembly of claim 1, wherein said segmented container comprises perforations.

3. The assembly of claim 1, wherein said segmented container comprises at least two segments oriented about a common axis, said common axis being the longitudinal axis of said container, and each of said at least two segments containing a first and a second longitudinal edge, whereby a first longitudinal edge from a first of said at least two segments is juxtaposed to a first longitudinal edge from a second of said at least two segments juxtaposed to define, thereby defining a first expansion joint between said at least two segments, and thereby providing circumferential clearance between said at least two segments.

4. The assembly of claim 3, wherein at least one of said first and second longitudinal edge is radially offset from the other of said first and second longitudinal edge.

5. An assembly for use in making a self-supporting ceramic composite structure comprising a filler and a polycrystalline ceramic matrix embedding said filler, said ceramic matrix comprising an oxidation reaction product of a parent metal with an oxidant, said assembly comprising:
   (a) a segmented container;
   (b) a permeable mass of filler disposed within said container; and
   (c) a body of parent metal disposed in contact with said mass of filler, said segmented container comprising at least two segments oriented about a common axis, said common axis being the longitudinal axis of said container, and each of said at least two segments containing a first and second longitudinal edge, whereby a first longitudinal edge from a first of said at least two segments is juxtaposed to a first longitudinal edge from a second of said at least two segments, thereby defining a first expansion joint between said at least two segments and whereby a second longitudinal edge from a first of said at least two segments is juxtaposed to a second longitudinal edge from a second of said at least two segments, thereby defining a second expansion joint between said at least two segments, the coefficient of thermal expansion of said at least two segments being greater than the coefficient of thermal expansion of said mass of filler, said first and second expansion joints accommodating thermal expansion of said at least two segments by circumferential expansion thereof, thereby inhibiting radial expansion of said segmented container so as to reduce volumetric expansion of said container.

6. The assembly of claim 4, wherein said first and second longitudinal edges are offset from each other.

7. The assembly of claim 4, wherein said first of said at least two segments comprises a body portion, and a first longitudinal edge from said first of said at least two segments comprises a longitudinal marginal lip, said marginal lip: (i) being joined to said body portion by a radially-extending shoulder; (ii) being radially offset from said body portion and extending circumferentially therefrom beyond said shoulder; and (iii) terminating at a point which is radially offset from said body portion thereby comprising an offset longitudinal edge, to thereby provide a circumferential clearance space between said shoulder and said offset longitudinal edge.

8. The assembly of claim 7, wherein said marginal lip is radially offset outwardly from said body portion whereby the longitudinal edge in which said lip terminates comprises a radially outwardly longitudinal edge.

9. The assembly of any one of claims 1, 2, 3, 4, 6, 7 or 8, wherein said segmented container comprises a metal alloy selected from the group consisting of nickel-based and iron-based high-temperature alloys.

10. The assembly of claim 9, wherein said metal alloy comprises a material selected from the group consisting of stainless steel, a nickel-chromium alloy, an iron-chromium-aluminum alloy, a nickel-molybdenum alloy and a nickel-iron-chromium alloy.

11. The assembly of any one of claims 1, 2, 3, 4, 6, 7 or 8, wherein said segmented container comprises at least one longitudinal segment of a cylindrical sleeve.

12. The assembly of any one of claims 1, 2, 3, 4, 6, 7 or 8, comprising at least one liner positioned between said filler and said segmented container.

13. The assembly of any one of claims 1, 2, 3, 4, 6, 7 or 8, further including support means disposed exteriorly of said container in engagement therewith to said segmented container.

14. The assembly of claim 13, wherein said support means comprises a perforated vessel encasing said segmented container.

15. The assembly of claim 1, including a dopant used in conjunction with the parent metal.

16. The assembly of claim 1, wherein said filler comprises a conformable filler.

17. The assembly of claim 12, wherein said liner comprises at least one material selected from a metal and a ceramic.

18. The assembly of claim 17, wherein said liner is perforated.

19. The assembly of claim 11, wherein said at least one longitudinal segment of a cylindrical sleeve has at least one of a cylindrical, flat, oval, and polygonal geometry.

* * * * *